May 5, 1970 H. HALFMANN 3,510,600

MULTISTAGE CROSSPOINT SWITCHING ARRANGEMENT

Filed Feb. 1, 1967 2 Sheets-Sheet 1

May 5, 1970 H. HALFMANN 3,510,600

MULTISTAGE CROSSPOINT SWITCHING ARRANGEMENT

Filed Feb. 1, 1967 2 Sheets-Sheet 2

3,510,600

MULTISTAGE CROSSPOINT SWITCHING ARRANGEMENT

Heinrich Halfmann, Korntal, Germany, assignor to International Standard Electric Corporation, New York, N.Y., a corporation of Delaware Filed Feb. 1, 1967, Ser. No. 613,157
Claims priority, application Germany, Feb. 19, 1966, St 25,012
Int. Cl. H04q 3/495
U.S. Cl. 179—18 6 Claims

ABSTRACT OF THE DISCLOSURE

Control of switching grids is based on the guide wire method. The guide wires are used for offering, access, through-connection and holding—no further control wire is necessary for the intermediate link. This is achieved by using positive, negative, and ground potentials and by connecting the crosspoint relay windings between two guide wires at the crossings.

Figure 1:
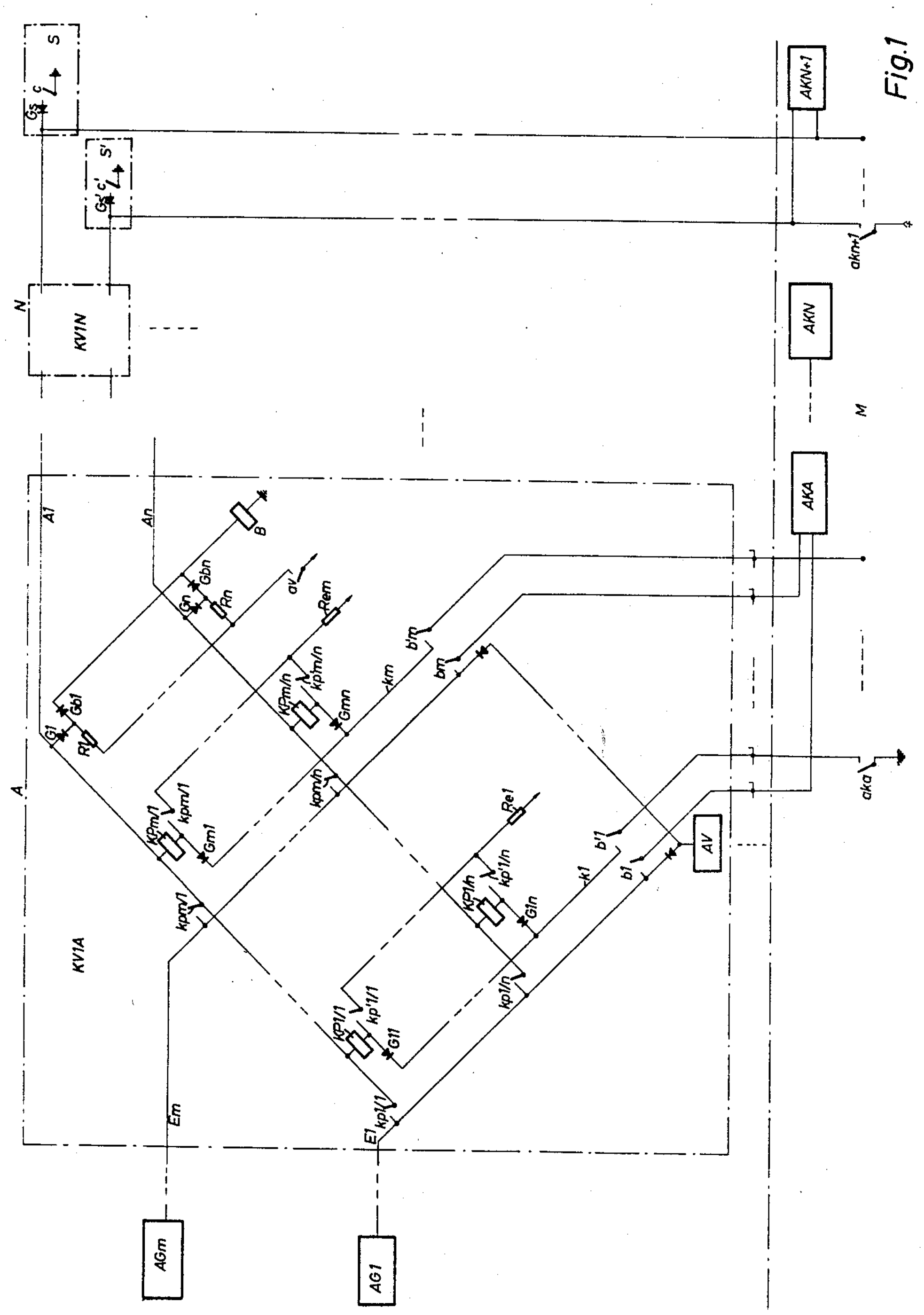

This invention relates to a circuit arrangement for a stage-by-stage controlled, multi-stage crosspoint arrangement having an associated single-wire guide wire network, simulating the speech path network.

With the aid of guide wires, a connecting path can be selected stage by stage through a simulating network. To make such selections, offering and access potentials are applied to the guide wire of an output column of a switching multiple. A switching means connects all guide wires of the input rows for the switching multiple (and the switching wires individually associated with them) to a marker which selects one of the guide wires bearing the offering potential.

Such a circuit arrangement is described in an article by H. Schonemeyer "Das Leitaderverfahren als Mittel zur Wegesuche in mehrstufigen Koppelnetzen" (The Guide Wire Method as a Means for Route Search in Multi-Stage Switching Networks), published in SEL-Nachrichten, 11th year of publication, 1963, No. 3, pages 109–120. As may be gathered from FIG. 6, page 113 of this article, the described method requires not only the guide wires but also at least one other wire, called a seize-wire.

An object of the invention to provide a circuit arrangement in which for the through-connection of a selected path does not require the additional auxiliary or seizing wire in addition to the guide wire.

According to the invention, the winding of each crosspoint relay is connected in series with a diode. This series circuit is inserted at the crossing between the guide wire and the switching wire of the output column and input row. The marker applies a reference potential to the switching wire of the selected input row. The offering and the access potentials have opposite polarities relative to each other and compared to the reference potential. By the arrangement of the windings of the crosspoint relays, and by selecting the potentials used, the guide wire can be used, not only for route search and route selection, but also for though-connection. Thus, the auxiliary or seizing wire is rendered superfluous.

A further embodiment of the invention provides guide wires of both the output columns and the input rows which are connected to each other at each of their crosspoints. This connection is made via a make-contact of the crosspoint relay associated with the respective crosspoint.

In this way, each responding crosspoint relay applies the access potential appearing on the guide wire of the output column to the guide wire of the selected input row. This avoids the expenditure, hitherto required in the marker, for applying the access potential to the guide wire. This construction is especially suitable if the crosspoint relays include contacts which are not already used to serve other purposes. If the crosspoint relays do not have available contacts, the access potential can also be applied to the guide wire of the selected input row by the marker.

Another embodiment of the invention provides that an operated crosspoint relay is connected by its own make-contact to a holding wire individually associated with the input rows and carrying holding potential. After the marker is switched off, the guide wire which was carrying the access potential is connected to receive the reference potential via a holding contact. From this, it should be noted that neither an intrinsic holding winding nor an auxiliary seize wire in the switching network is required to form a holding circuit. The guide wire is used not only for pulling-up the excited crosspoint relay, but also for holding an established connecting path.

According to another aspect of the invention, the switching grid is constructed so that, in the through-connected crosspoints, the guide wires are also through-connected. Hence, a holding circuit is completed for all excited crosspoint relays in a connecting path when a reference potential is applied to the guide wires of a connecting path. A switching means, associated with the seized output of the crosspoint arrangement, applies this reference potential through the series-connected, excited crosspoint relays.

A further embodiment of the invention provides for crosspoint arrangements constructed so that the guide wires are not through-connected. Here, the reference potential is applied to a guide wire extended through a contact of a holding relay inserted into the holding circuit of the respective excited crosspoint relay of the preceding switching stage.

According to a still further embodiment of the invention, the reference potential is applied via a rectifier which is made non-conductive by an access signal applied to the respective guide wire. Thus, a proper decoupling is secured between the reference and access potentials. That is, the holding circuit becomes effective only when the access potential is switched off by disconnecting the marker, which is equal to a disconnection of the starting circuit.

Figure 2:
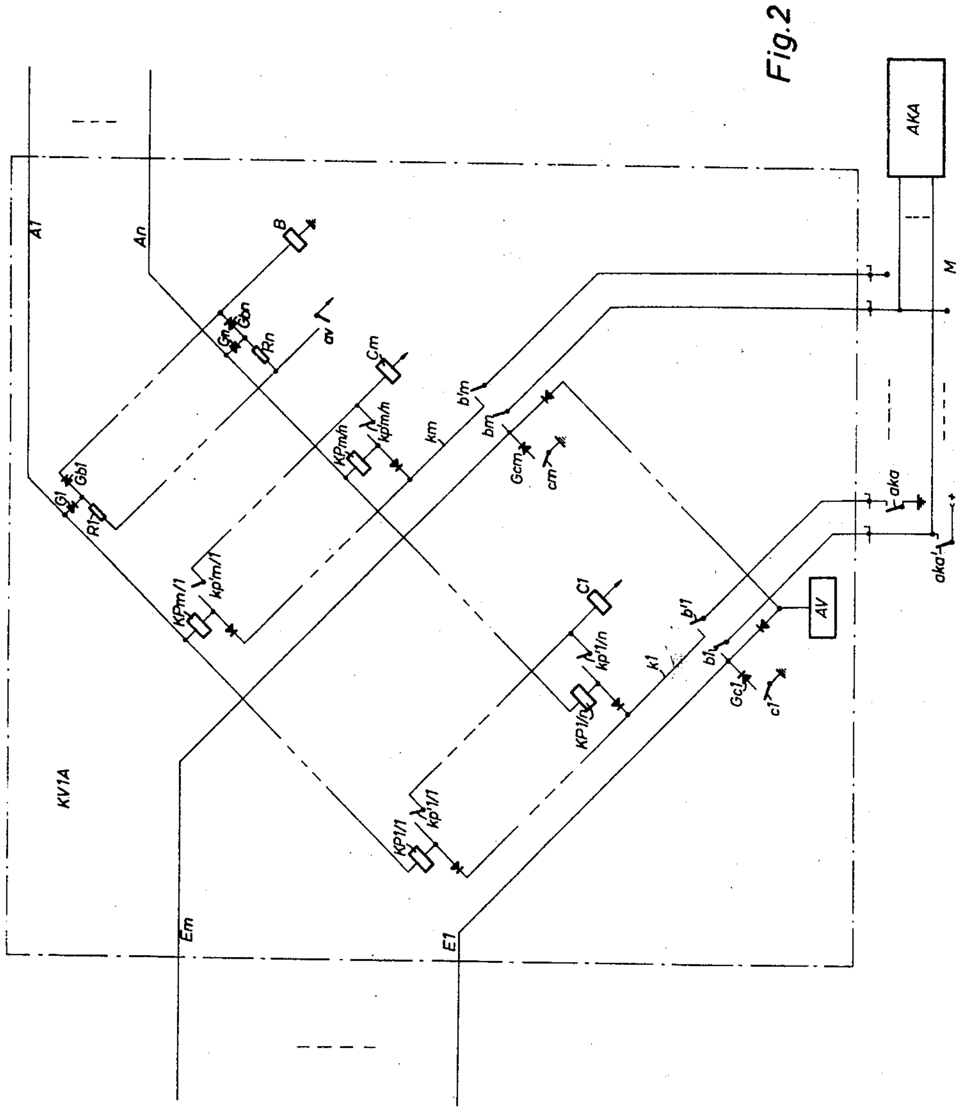

The above mentioned and other features of this invention and the manner of obtaining them will become more apparent, and the invention itself will be best understood by reference to the following description of an embodiment of the invention taken in conjunction with the accompanying drawings, in which:

FIGS. 1 and 2 of the accompanying drawing show two examples of embodiments of the invention.

FIG. 1 shows a switching multiple KV1A of the first switching stage A of a switching grid, comprising N switching stages. Of the other switching multiples in the grid, only the switching multiply KV1N of the stage N is indicated by a rectangle. The reference characters E1 and E*m* designate two inputs of the switching grid. These inputs are connected between corresponding rows of the switching multiple KV1A and the line circuits AG1 and AG*m*, respectively. To initiate the establishment of a connection, one of the line circuits AG applies a negative potential as offering potential to an idle end point on the crosspoint arrangement. The offering potential then appears on the guide wires of the inputs E1 and E*m*. This offering potential extends via the guide wires to the offering signal regenerator AV of the switching multiple KV1A. By closing its contact *av*, this offering signal regenerator applies negative potential via the resistors R1 . . . R$n$ and rectifiers G1 . . . G$n$, to the guide wires of the outputs A1 . . . A$n$, associated with the individual columns of the switching multiple. The offering potential now fans-out across all available intermediate links to the succeeding switching stage. There, it is again regenerated in the offering signal regenerators of that stage. After a step-by-step extension, the offering potential reaches all outputs of the crosspoint arrangement which can be reached from the initiating inputs E1 and E$m$.

As will be demonstrated, the guide wires of the seized intermediate links bear a low-ohmic ground potential, so that the offering potential cannot extend through on such guide wires.

A selecting chain AKN+1, in the marker, is started when the offering potential appears on at least one output of the final switching stage. This chain is associated with a switching stage and is used to select one of the outputs where the offering potential appears on a guide wire. Through a contact *akn*+1, the guide wire receives low-ohmic positive potential which provides the effect of an access potential appearing at an output of a switching multiple of the final switching stage.

The resulting processes are explained with the aid of the switching multiple KV1A. It is assumed that the low-ohmic, positive access potential applied through contacts *akn*+1 appears at the output A$n$ of stage A. This positive potential causes relay B to respond via the rectifiers G$n$ and G$bn$. Relay B closes its contacts *b*1 . . . *b'*1 . . . *b'm*. Each of these contacts *b*1 . . *bm* connects the guide wire of an input row with a selecting chain AKA of the marker M, associated with one of the stages A. A switching or crosspoint wire *k*1 . . . *km* is also associated with each input row. These wires are connected to the marker through the contacts *b'*1 . . . *b'm* of relay B. The selecting chain AKA selects one of the guide wires, bearing an offering potential applied through a line circuit AG. At least one such wire, bearing offering potential must exist, because otherwise there would have been no demand and no access potential could have appeared at one output of the switching multiple. For example, the switching or crosspoint wire *k*1, associated with the selected guide wire or input row respectively, is connected to ground via the contact *aka* of the selecting chain AKA. This ground potential is now effective, as a switching potential in the following circuit: ground, contacts *aka*, *b'*1, conductor *k*1, rectifier G1$n$, the winding of the crosspoint relay KP1/$n$, the guide wire of the column associated with the output A$n$ . . . contact *akn*+1, and the access potential (+).

Care is taken to be sure that the difference between ground and the access potential applied to the guide wire at the output A$n$ is at least equal to the responding voltage of a crosspoint relay. Here the crosspoint relay KP1/$n$, and only that one, responds in the described circuit including the guide wire of the row E1 and the contact *kp*1/$n$. Consequently, the offering potential, appearing at the output A$n$ extends through to the input E1 and line circuit AG1. If stage A were not the first stage in the network, the access potential would extend over the guide wire of the link, connected between the input E1 and the output of a switching multiple of the preceding switching stage. The same processes occur in the preceding stage responsive to this signal.

From this description, it should be evident how a step-by-step selection takes place starting from the last stage N and extending in the direction towards the first stage A. The connecting paths are marked with the offering signal to cause a selecting process in a switching stage. The corresponding crosspoint relay operates by a cooperation between the offering and the access potential. As always only the guide wire of one single column can carry the access potential, and only one single crosspoint or switching wire can carry ground potential. Therefore only that particular crosspoint relay is operated which corresponds to the respectively selected section of the connecting path.

When operating, the crosspoint relay KP1/$n$ prepares a holding circuit for itself through its contact *kp'*1/$n$, the resistor R$e$1, individually provided for each row, and on to the negative potential indicated by an arrowhead. The holding circuit extends in the opposite direction via the winding of the crosspoint relay KP1$n$ and the guide wires, through-connected by the energized crosspoint relays of the various stages to a switching circuit such as circuit S associated with the output selected by the selecting chain AKN+1. In the holding circuit, the contact *c* was closed when the output was seized. Consequently, ground was applied to the guide wires of this output via the rectifier G$s$.

As long as the positive access potential applied via contact *akn*+1 is still effective on this guide wire, the rectifier G$s$ is made non-conductive. However, after the marker switches off, the holding circuit becomes effective. The marker is so switched off after all stages are through-connected.

In the example of the described embodiment, the access potential never reaches the preceding stage until after having been through-connected in the switching stage. For speeding up the establishment of the connection, the access potential may also be applied, as shown in FIG. 2, from the marker via a contact *aka'* associated with the selected input guide wire. The route search process is then made independent of the responding time of the crosspoint relay.

Also, the holding circuit differs in the circuit arrangement shown in FIG. 2 from that shown in FIG. 1. In FIG. 2, a holding wire is shown as extending to a local "C" relay. Since this wire is not of the through-going type shared by all cascaded stages, it may be more advantageous, with regard to the load applied to the holding contact *c* (FIG. 1). Also, it enables the embodiment of FIG. 2 to function with one less contact per crosspoint relay. In this arrangement, the guide wires are not through-connected via contacts of the energized crosspoint relay. Instead, each of the resistors R$e$1 . . . R$em$ (FIG. 1) inserted in the holding circuits individually provided for the rows, is replaced by a relay C . . . C$m$ which operates as soon as a holding circuit is established. For example, relay C1 responds upon energization of the crosspoint relay KP1/$n$. Then it applies ground potential via its contact *c*1 and the rectifier G$c$1 to the guide wire of the row associated with the selected input E1. This ground potential becomes effective as the holding potential for the crosspoint relay in the preceding switching stage as soon as the access potential is disconnected. Before such disconnect, the access potential had rendered the rectifier G$c$1 non-conductive, and had been applied to the aforementioned guide wire by the action of contact *aka'*.

While the principles of the invention have been described above in connection with specific apparatus and applications, it is to be understood that this description is made only by way of example and not as a limitation on the scope of the invention.

I claim:

1. A circuit arrangement for a stage-by-stage controlled coordinate multistage crosspoint arrangement of rows and columns, said arrangement comprising a guide wire network simulating a speech path network, said guide wire network comprising input rows of guide wires and output columns of guide wires, means for applying an offering potential to the rows of guide wires, means responsive to said offering potential appearing at the output columns of said guide wire network for indicating the idle condition of at least certain of the wires of said simulated speech path network and for therefore applying an access potential to the output columns of said guide wire network, marker means for controlling the switching of the crosspoints to connect a path through said simulated network, means responsive to said access potential appearing on the guide wires of an output column for connecting all of the guide wires of the input rows to said marker means, said crosspoints comprising a relay in series connection with a diode inserted between the guide wires and a switching wire extending from said marker means, selecting means in said marker for selecting one of the input guide wires bearing the access potential and applying a reference potential to the switching wire disposed on the opposite side of the crosspoint relay from the said selected guide wire, whereby said crosspoint relay operates.

2. A circuit arrangement according to claim 1 wherein the guide wires of both the output columns and the input rows are connected to each other at each of their crosspoints via a make-contact of the crosspoint relay associated with the respective crosspoint.

3. A circuit arrangement according to claim 1, and switching means associated with the seized output of the crosspoint arrangement operated responsive to the seizure of a crosspoint associated with the seized output for applying said reference potential to the guide wires of a connected path that is series-connected through the excited crosspoint relays (KP1*n*).

4. A circuit arrangement according to claim 1 wherein an operated crosspoint relay is connected by the action of its own make-contact to a holding wire individually associated with the input rows and carrying holding potential, and means responsive to the marker switching off for applying a reference potential via a holding contact to the guide wire previously carrying the access potential.

5. A circuit arrangement according to claim 2, and means for applying said reference potential to a guide wire through a contact of a holding relay inserted into the holding circuit of the excited crosspoint relay of the preceding switching stage.

6. A circuit arrangement according to claim 5 and means for applying said reference potential across a rectifier rendered non-conductive by the effect of an access potential applied to the respective guide wire.

References Cited

UNITED STATES PATENTS

| | | | |
|---|---|---|---|
| 3,347,994 | 10/1967 | Schlüter | 179—18.7 |
| 3,347,995 | 10/1967 | Schlüter et al. | 179—18.7 |

KATHLEEN H. CLAFFY, Primary Examiner

W. A. HELVESTINE, Assistant Examiner